(12) United States Patent
Inoue et al.

(10) Patent No.: US 7,840,559 B2
(45) Date of Patent: Nov. 23, 2010

(54) USER TERMINAL AND CONTENT SEARCHING AND PRESENTATION METHOD

(75) Inventors: Makoto Inoue, Tokyo (JP); Takatoshi Nakamura, Kanagawa (JP); Masamichi Asukai, Kanagawa (JP); Kosei Yamashita, Kanagawa (JP); Yasushi Miyajima, Kanagawa (JP); Mitsuru Takehara, Tokyo (JP); Toshiro Terauchi, Tokyo (JP); Yoichiro Sako, Tokyo (JP); Masafumi Matsuda, Tokyo (JP); Toru Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 11/392,154

(22) Filed: Mar. 29, 2006

(65) Prior Publication Data

US 2006/0233063 A1 Oct. 19, 2006

(30) Foreign Application Priority Data

Mar. 30, 2005 (JP) ............................. 2005-098535

(51) Int. Cl.
*G06F 7/00* (2006.01)
*G06F 17/30* (2006.01)
(52) U.S. Cl. ...................................... 707/734; 707/913
(58) Field of Classification Search .............. 369/30.03; 707/104.1, 2
See application file for complete search history.

(56) References Cited

U.S. PATENT DOCUMENTS

| 6,987,221 | B2* | 1/2006 | Platt ............................. | 84/601 |
| 6,993,532 | B1* | 1/2006 | Platt et al. ................... | 707/102 |
| 2002/0152396 | A1* | 10/2002 | Fox et al. ..................... | 713/200 |
| 2006/0015193 | A1* | 1/2006 | Kato ............................. | 700/2 |
| 2007/0124698 | A1* | 5/2007 | Majumder .................. | 715/811 |

FOREIGN PATENT DOCUMENTS

| JP | 07-234881 | 9/1995 |
| JP | 11-032070 | 2/1999 |
| JP | 2003-132662 A | 5/2003 |
| JP | 2004-054023 A | 2/2004 |
| JP | 2004-326451 A | 11/2004 |
| WO | WO 2004/086405 A1 | 10/2004 |
| WO | WO 2004/095317 A1 | 11/2004 |

OTHER PUBLICATIONS

Musicmobs IN; "Mobster: a better way to browse your music"; www.MUSICMOBS.COM, [Online]; Nov. 14, 2004, XP002391684.

(Continued)

*Primary Examiner*—Pierre M Vital
*Assistant Examiner*—Jason Liao
(74) *Attorney, Agent, or Firm*—Wolf, Greenfield & Sacks, P.C.

(57) ABSTRACT

A content searching and presentation method in a terminal of an original user having a playlist includes the steps of accessing a playlist of a different user from the terminal and obtaining the playlist of the different user; computing a similarity between the obtained playlist of the different user and the playlist of the original user, which is a playlist owned by the terminal, in accordance with a predetermined computation equation; and presenting, as a searched result, content that is contained in the playlist of the different user and that is not contained in the playlist owned by the terminal when the computed similarity exceeds a predetermined threshold value.

17 Claims, 8 Drawing Sheets

OTHER PUBLICATIONS

Christopher Been; "Joining the Mob: When it comes to offering music recommendations, this mob rules"; PLAYLISTMAG.COM, [Online]; Oct. 19, 2004, XP002391685.

Mystrands Inc; "Mystrands discovery for Windows", www.MYSTRANDS.COM, [Online]; Jul. 21, 2006, XP002391686.

Siren Systems Inc.; "Soundflaborbeta-Algorythic Taste Matching—get personnalized recommendation"; www.SIRENSYSTEMS.COM, [Online]; Oct. 24, 2004, XP002391687.

MIXMATCHER.COM; "Mixmatcher—help"; www.MIXMATCHER.COM, [Online]; Oct. 13, 2004, XP002391688.

Matt Vance; "Online music sources: finding tracks that matter"; PLAYLISTMAG.COM, [Online]; May 4, 2005; XP002391689.

\* cited by examiner

| NUMBER | COMBINATION | | SIMILARITY | SIMILAR? | MUSICAL PIECE TO BE ADDED TO PLAYLIST OF ORIGINAL USER | MUSICAL PIECE TO BE REGISTERED IN LIST OF CANDIDATES FOR MUSICAL PIECES TO BE PURCHASED |
| --- | --- | --- | --- | --- | --- | --- |
| | PLAYLIST OF ORIGINAL USER | PLAYLIST OF DIFFERENT USER | | | | |
| 1 | U1 | W1 | 2/3 | YES | SongL | |
| 2 | U2 | W1 | 0 | NO | | |
| 3 | U3 | W1 | 0 | NO | | |
| 4 | U1 | W2 | 0 | NO | | |
| 5 | U2 | W2 | 2/3 | YES | | SongN (→U2) |
| 6 | U3 | W2 | 1/3 | NO | | |

USER TERMINAL AND CONTENT SEARCHING AND PRESENTATION METHOD

CROSS REFERENCES TO RELATED APPLICATIONS

The present invention contains subject matter related to Japanese Patent Application JP 2005-098535 filed in the Japanese Patent Office on Mar. 30, 2005, the entire contents of which are incorporated herein by reference.

BACKGROUND OF THE INVENTION

1. Field of the Invention

The present invention relates to a user terminal, such as a PC (personal computer) or a cellular phone terminal, in which content such as musical pieces is recorded, and to a content searching and presentation method in the user terminal.

2. Description of the Related Art

As music distribution through a network has become popular and storage has become larger, the number of users who have a large number of musical pieces in a terminal such as a PC or a music player and who create a playlist and manage musical pieces has increased. Among them, there are many users who make their playlists public on the web.

Examples of a method for automatically creating a playlist include, as a well-known technology, a method for selecting a musical piece by the number of times of playback, by the date at which a musical piece was played back last, by the year in which the musical piece was sold, and by the date at which a musical piece was added to one's collection; a method for selecting a musical piece containing a key word specified by a user in the music title, the album title, and the artist name; a method for selecting a musical piece by genre; and a method for selecting a musical piece according to a rank made by the user himself/herself.

Even in a form other than a playlist, there are lots of musical piece information that can be used from a PC, a cellular phone terminal, etc., on a network.

Accordingly, by using these playlists that are made public, musical piece information on the network, etc., the user can register, in a playlist, musical pieces owned by themselves in a new combination, and can enjoy a new way of enjoying music, such as finding a musical piece that is not known to the user and purchasing it.

In Japanese Unexamined Patent Application Publication No. 2004-54023, it is disclosed that each user holds a list of musical pieces recommended by each user in a portable terminal of each user, the list of recommended musical pieces is exchanged among terminals, and in a portable terminal of a certain user, a list of collected musical pieces in which the list of musical pieces recommended by another user is created, and a musical piece is selected on the basis of the number of users who recommend the musical piece.

SUMMARY OF THE INVENTION

However, when playlists that are made public, musical piece information on the network, etc., are to be used, since the number of musical pieces that are made public and the number of musical pieces on a network are enormous, it is troublesome to select a musical piece by listening to the musical pieces one by one or by reading artist information.

For allowing a user terminal to perform this musical piece selection, for example, a method is conceived in which a user specifies a genre, an artist name, etc., as key words, and the user terminal combines musical pieces matching those conditions and register them in a playlist. However, in this method, musical pieces of the same artist or only musical pieces of similar musical tunes are often collected, and thus finding of unexpected combinations is difficult to occur.

Furthermore, it is considered that a playlist of another user that is made public is imported (copied) as it is as his/her own playlist. In this method, when all the playlists that are made public of another user are to be copied, similar playlists are created in duplication on one hand, and playlists of combinations that do not match his/her interests are created on the other hand. Thus, later, playlists may need to be organized and integrated. When a playlist that matches one's interests is selected and copied from the playlists that are made public of another user, it takes time to select a playlist, and similar playlists are likewise created in duplication.

What a user who enjoys music really wants is a combination matching his/her interests. One of methods for reliably finding such a combination is to request a person having interests similar to his/her interests to recommend a musical piece.

In the method disclosed in Japanese Unexamined Patent Application Publication No. 2004-54023, a list of recommended musical pieces is obtained from another user, and a musical piece is selected from within it. However, in this method, a musical piece matching his/her interests is not necessarily be selected.

Accordingly, the present invention aims to be capable of finding only content matching one's interests, capable of updating his/her playlist while the playlist is kept to match one's interests, and capable of obtaining assistance without a user performing special instructions or operation other than accessing a playlist of another user as a result of an apparatus performing "recommendations by a person matching user's interests".

According to an embodiment of the present invention, there is provided a content searching and presentation method in a terminal of an original user having a playlist, the content search presentation method including the steps of: accessing a playlist of a different user from the terminal and obtaining the playlist of the different user; computing a similarity between the obtained playlist of the different user and the playlist of the original user, which is a playlist owned by the terminal, in accordance with a predetermined computation equation; and presenting, as a searched result, content that is contained in the playlist of the different user and that is not contained in the playlist owned by the terminal when the computed similarity exceeds a predetermined threshold value.

In the above-described content searching and presentation method, with respect to only a combination in which the similarity between the playlist of the original user and the playlist of the different user exceeds a threshold value, content that is contained in the playlist of the different user of the combination and that is not contained in the playlist of the original user of the combination is presented to the user, and the user terminal performs "recommendations by a person matching user's interests".

DESCRIPTION OF THE PREFERRED EMBODIMENTS

Figure 1:
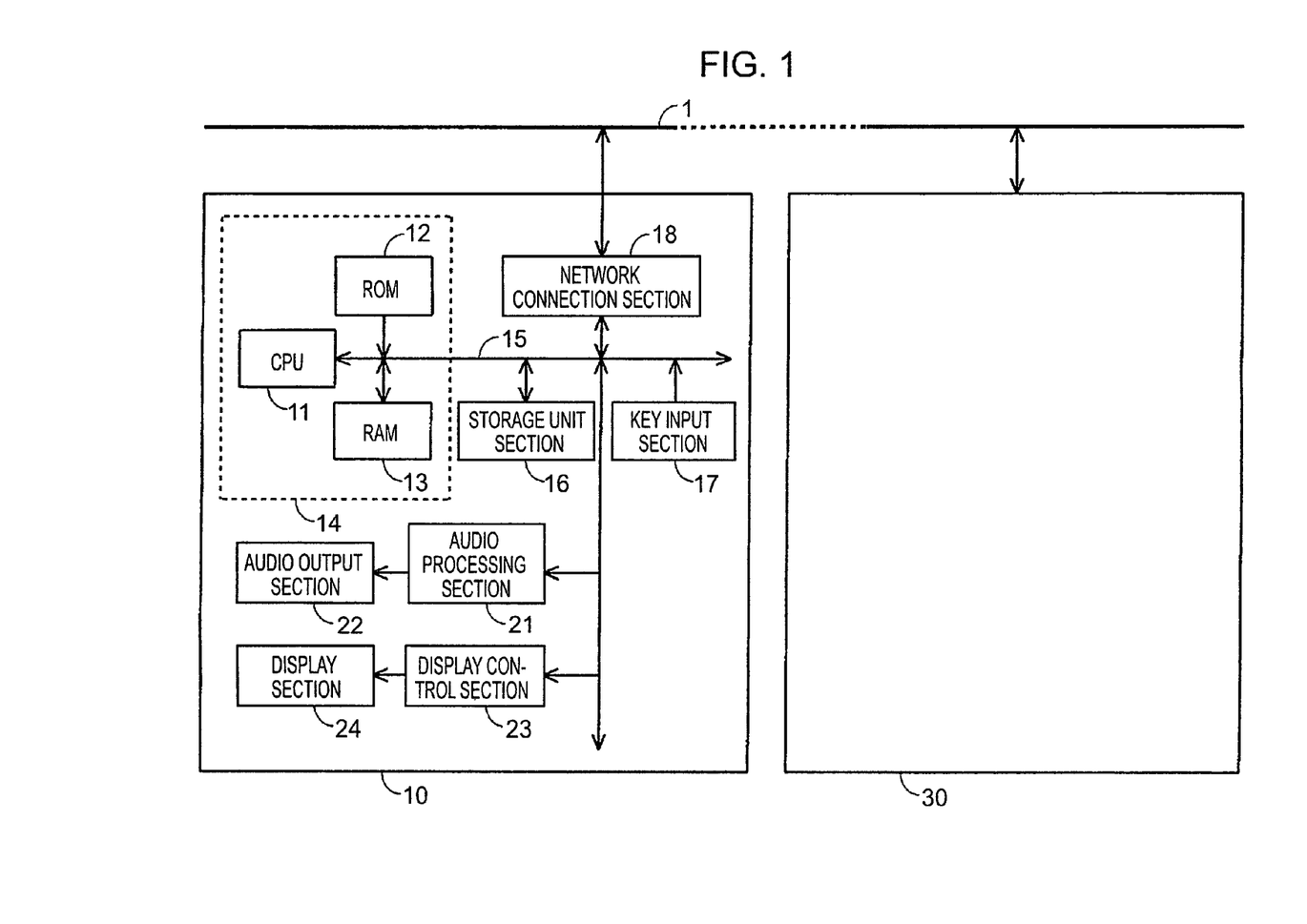
FIG. 1 shows an example of a system and a user terminal according to an embodiment of the present invention.
Figure 2:
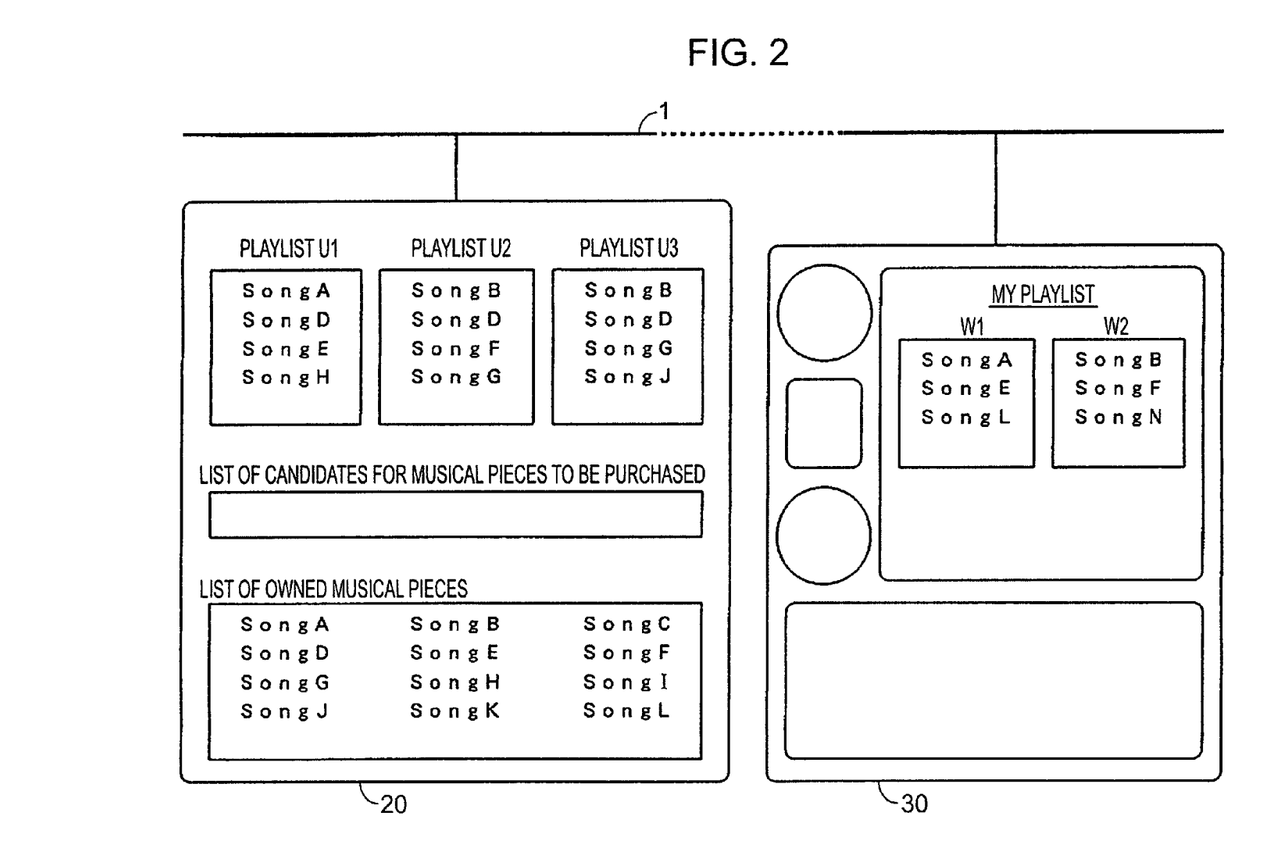
FIG. 2 shows an example of playlists of an original user and playlists of a different user.

1. Embodiment of System and User Terminal: FIG. 1 and FIG. 2

FIG. 1 shows an example of a system and a user terminal according to an embodiment of the present invention, and also shows a case in which content is a musical piece and a playlist is a list of musical pieces.

In the system of this example, a user terminal 10 of a certain user X is connected to a web page 30 of a user Y via a network 1.

The network 1 is a computer network, such as the Internet or a network for cellular phones. Examples of the user terminal 10 include a PC (personal computer) and a cellular phone terminal having functions for connection to the network 1. Furthermore, a terminal having a function in which terminals directly communicate with one another, such as ad hoc communication and Bluetooth communication, is also included as the user terminal 10.

More specifically, the user terminal 10 includes a CPU 11. A ROM 12 in which a program and data are written, a RAM 13 to which the program and the data are loaded, a storage device section 16, a key input section 17, and a network connection section 18 are connected to a bus 15 for the CPU 11.

The storage device section 16 is a hard disk, an internal storage device such as a semiconductor memory, or a removable storage device such as an optical disc. The storage device section 16 can store data of a large number of musical pieces, and musical piece information such as a list of owned musical pieces, and a playlist is written thereinto. The network connection section 18 is connected to the network 1 by a web browser and accesses the web page 30.

Furthermore, an audio output section 22 is connected to the bus 15 via an audio processing section 21, and a display section 24 such as a liquid-crystal display section is connected thereto via a display control section 23. The audio processing section 21 expands that digital audio data that is compressed, such as musical piece data sent out to the bus 15, and converts it into an analog audio signal. The audio output section 22 is a speaker or a headphone.

The control section 14 including the CPU 11, the ROM 12, and the RAM 13, of the user terminal 10 controls each section of the user terminal 10 and performs a playlist updating process (to be described later).

In the user terminal 10, records exist in which, in addition to data of a large number of musical pieces, bibliographic information, such as titles of musical pieces (music titles), artist names, lyricists, music composers, and album titles, are recorded. Links to these records are collected in a list table 20 formed of a list of owned musical pieces, playlists, and a list of candidates for musical pieces to be purchased, shown in FIG. 2, and are managed.

The list of owned musical pieces is such that links of all the musical pieces owned by the user X in the user terminal 10 are collected. In this example, musical pieces A, B, C, D, E, F, G, H, I, J, K, and L are registered.

The "playlist" is such that the user X selects and combines those musical pieces that the user X wants to listen to according to various scenes, such as musical pieces that are listened to while going to work, musical pieces that are listened to while relaxing at home, or musical pieces that are listened to while driving a car from among the musical pieces owned by the user, and the links thereof are collected in a list. In this example, three playlists U1, U2, and U3 are created. In the playlist U1, the musical pieces A, D, E, and H are registered; in the playlist U2, the musical pieces B, D, F, and G are registered; and in the playlist U3, the musical pieces B, D, G, and J are registered. Hereinafter, the playlists of the user X will be referred to as "playlists of an original user".

In the list of candidates for musical pieces to be purchased, as will be described later, the control section 14 of the user terminal 10 allows the bibliographical information of the musical piece recommended to the user X, which is not owned by the user X, to be described.

In the web page 30 of the user Y, in this example, two playlists W1 and W2 are made public as playlists of the user Y. In the playlist W1, the musical pieces A, E, and L are registered; and in the playlist W2, the musical pieces B, F, and N are registered. Hereinafter, the playlists of the user Y will be referred to as "playlists of a different user".

2. Embodiment of Content Searching and Presentation Method: FIG. 3 to FIG. 8

(2-1. Method)

In the above-described system, the control section 14 of the user terminal 10 accesses the web page 30 of the network 1 under the control of the network connection section 18, obtains the playlists W1 and W2 of the different user, sequentially combines one of the playlists U1, U2, and U3 of the original user and one of the playlists W1 and W2 of the different user, and computes a similarity between the playlists (between the playlist of the original user and the playlist of the different user) in each combination.

As an example, the similarity is determined as follows:

similarity=(the number of musical pieces common to the playlist of the original user and the playlist of the different user of the target combination)/(the smaller number of the number of musical pieces of the playlist of the original user and the number of musical pieces of the playlist of the different user)  (1).

At this time, when making a determination as to whether or not the musical piece registered in the playlist of the original user is the same as the musical piece registered in the playlist of the different user, when sale source information exists, the two musical pieces are determined to be the same when the sale sources of the two musical pieces are the same and other musical piece information (bibliographical information) is the same, or when the sale sources of the two musical pieces are different but other musical piece information (bibliographical information) is the same. When sale source information does not exist, the two musical pieces are determined to be the same when other musical piece information (bibliographical information) is the same.

Figure 3:
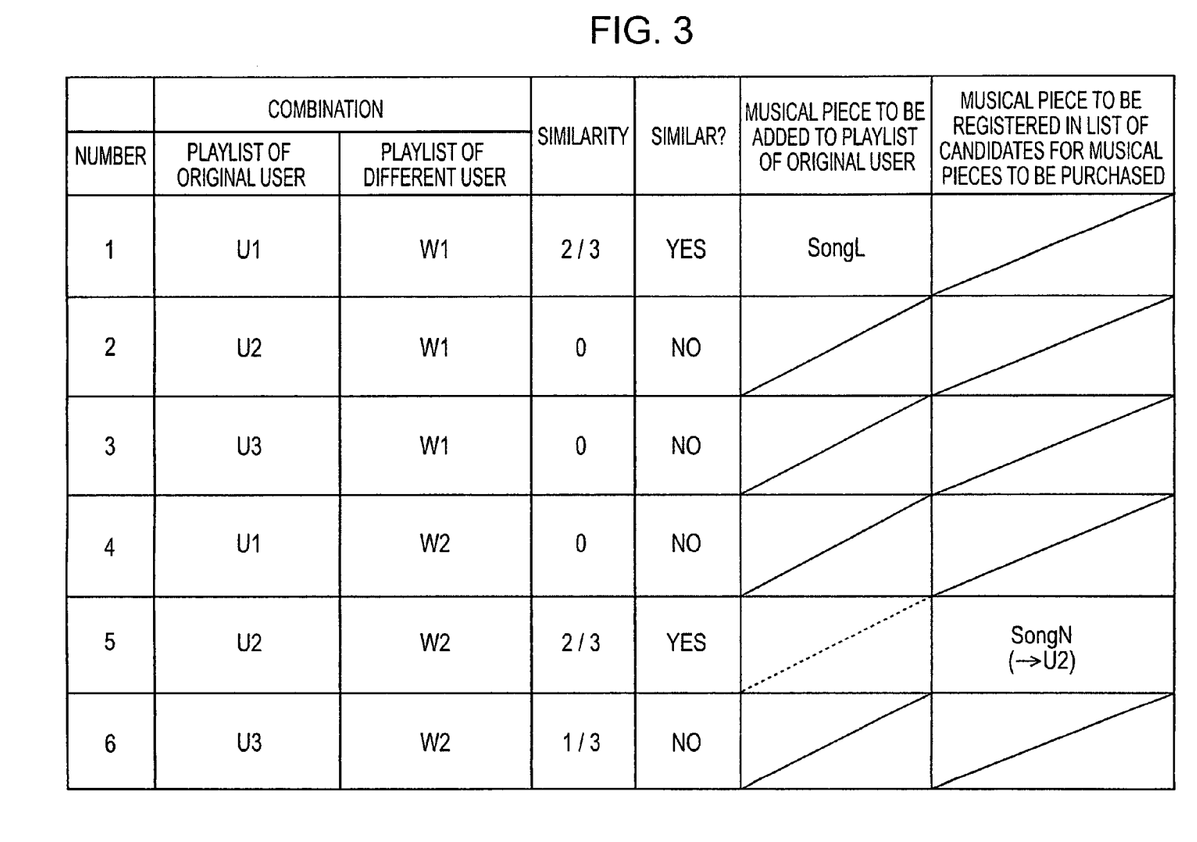
FIG. 3 shows a similarity between playlists in the case of FIG. 2.

When the similarity is computed on the basis of equation (1), in the example of FIG. 2, the following is satisfied, as shown in FIG. 3:

the similarity of the first combination (the playlist U1 and the playlist W1) is ⅔, the similarity of the second combination (the playlist U2 and the playlist W1) is 0, the similarity of the third combination (the playlist U3 and the playlist W1) is 0, the similarity of the fourth combination (the playlist U1 and the playlist W2) is 0, the similarity of the fifth combination (the playlist U2 and the playlist W2) is ⅔, and the similarity of the sixth combination (the playlist U3 and the playlist W2) is ⅓.

The control section 14 of the user terminal 10 compares the similarity computed in this manner with a predetermined threshold value. When the computed similarity is smaller than or equal to the threshold value, it is determined that the playlist of the original user of the target combination is not similar to the playlist of the different user of the target combination. When the computed similarity exceeds the threshold value, it is determined that the playlist of the original user of the target combination is similar to the playlist of the different user of the target combination.

When the similarity is computed on the basis of equation (1), for example, the threshold value is set to 0.5. Therefore, in the example of FIG. 2, the following determination is made, as shown in FIG. 3:

the first combination (the playlist U1 and the playlist W1) is similar, the second combination (the playlist U2 and the playlist W1) is not similar, the third combination (the playlist U3 and the playlist W1) is not similar, the fourth combination (the playlist U1 and the playlist W2) is not similar, the fifth combination (the playlist U2 and the playlist W2) is similar, and the sixth combination (the playlist U3 and the playlist W2) is not similar.

Then, with respect to the combination in which the playlist of the original user and the playlist of the different user are not similar, the control section 14 of the user terminal 10 ends the processing with respect to the combination. With respect to the combination in which the playlist of the original user and the playlist of the different user are similar, the control section 14 adds a musical piece that is contained in the list of owned musical pieces and in the playlist of the different user of the target combination and that is not contained in the playlist of the original user of the target combination, to the playlist of the target combination of the original user (2a), and registers a musical piece that is not contained in the list of owned musical pieces (therefore not contained in the playlist of the original user of the target combination) and that is contained in the playlist of the different user of the target combination into the list of candidates for musical pieces to be purchased.

Furthermore, in the example of FIG. 2, as shown in FIG. 3, with respect to the first combination, a musical piece L that exists in the list of owned musical pieces of the user X and in the playlist W1 of the user Y and that does not exist in the playlist U1 of the user X is added to the playlist U1 of the user X (3a). With respect to the fifth combination, a musical piece N that does not exist in the list of owned musical pieces of the user X and that exists in the playlist W2 of the user Y is registered into the list of candidates for musical pieces to be purchased of the user X (3b).

In the case of (2b) above, in the list of candidates for musical pieces to be purchased, together with the bibliographical information of the target musical piece, information is recorded which specifies the playlist of the original user (playlist identification information) to which the target musical piece should be added when the user X purchases the target musical piece and the musical piece data of the target musical piece is recorded in the user terminal 10. That is, in the case of (3b) above, information such that information for specifying a playlist U2 is attached to the bibliographical information of the musical piece N is described in the list of candidates for musical pieces to be purchased.

Figure 4:
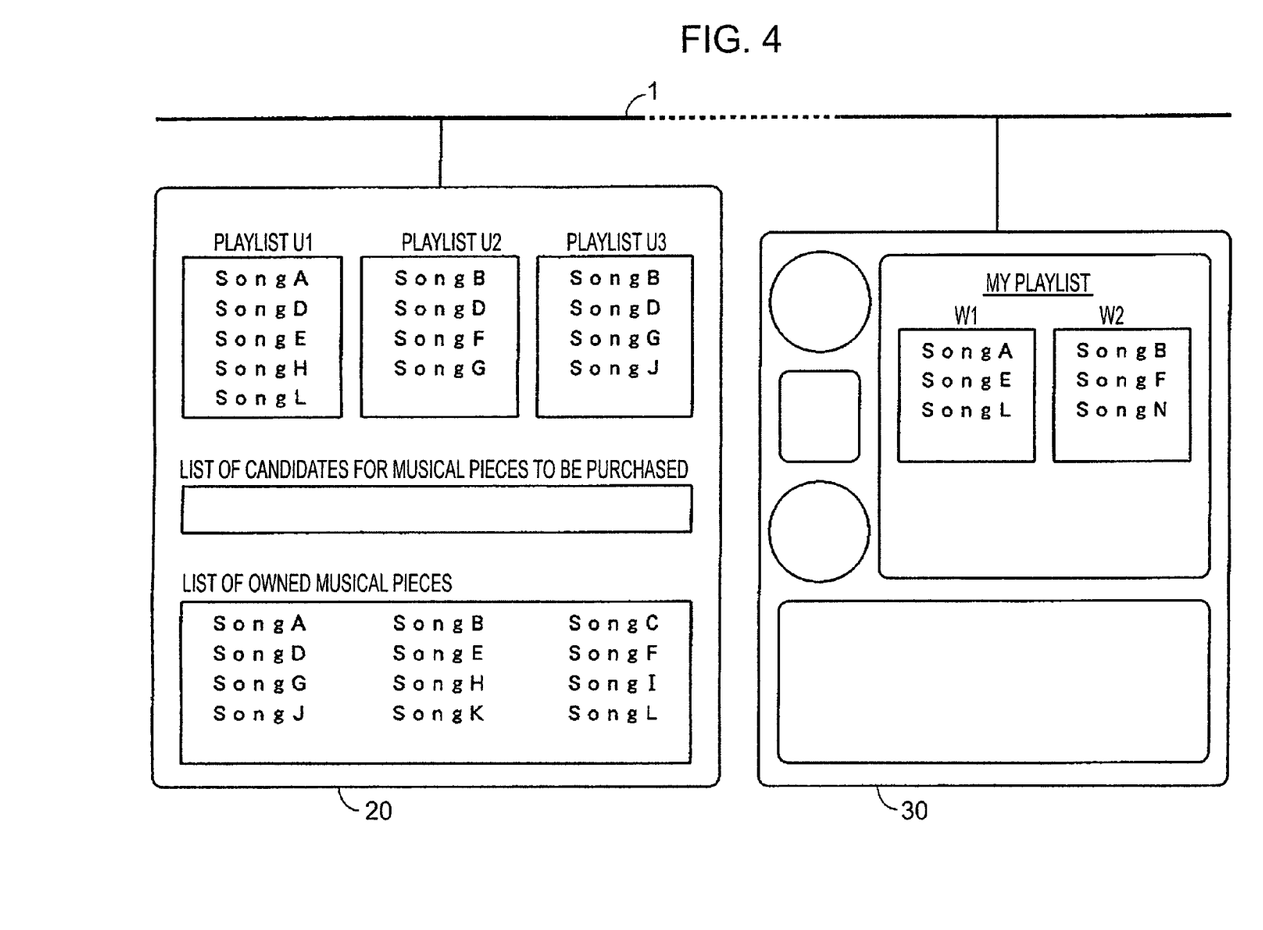
FIG. 4 shows an example of a playlist updated result by a method according to the embodiment of the present invention.

As a result of the above processing, in the example of FIG. 2, a list table 20 of the user X is rewritten as shown in FIG. 4.

Figure 5:
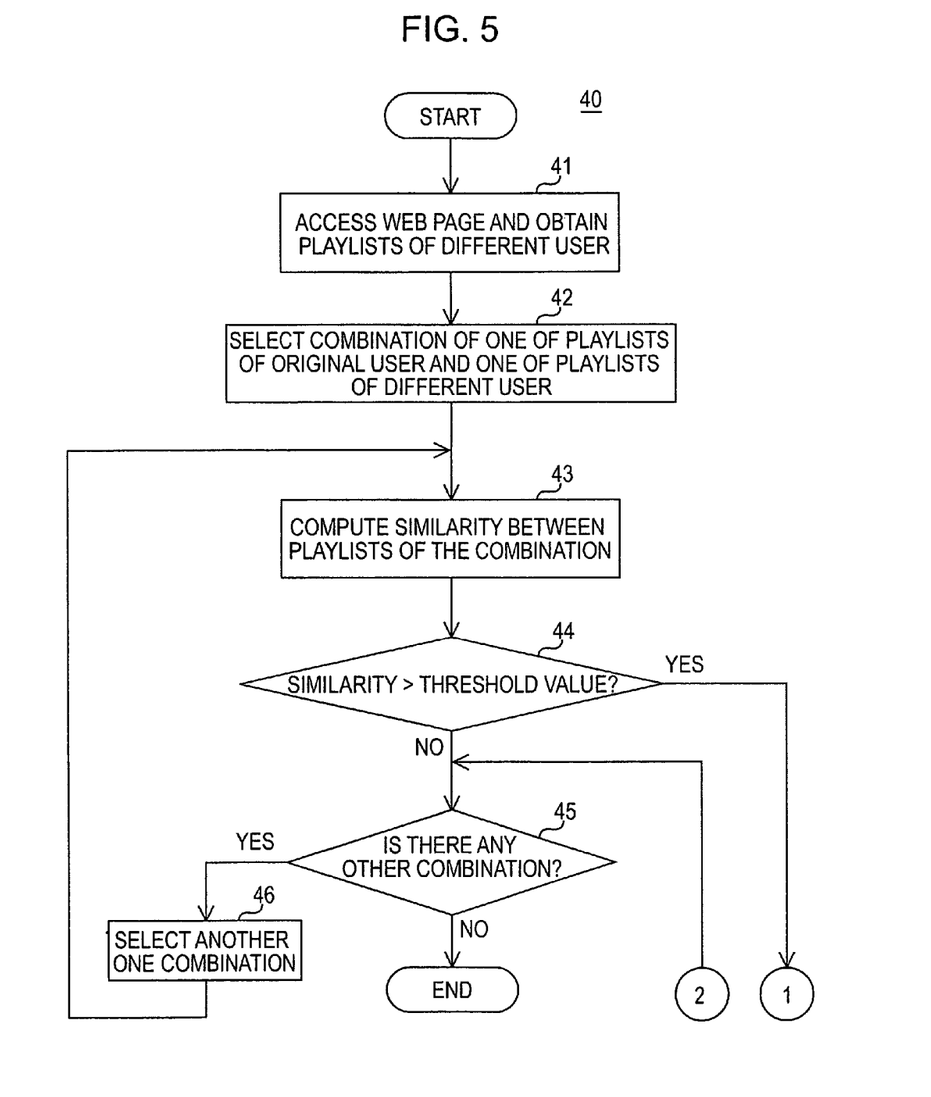
FIG. 5 shows portions of an example of a playlist updating process performed by the user terminal.
Figure 6:
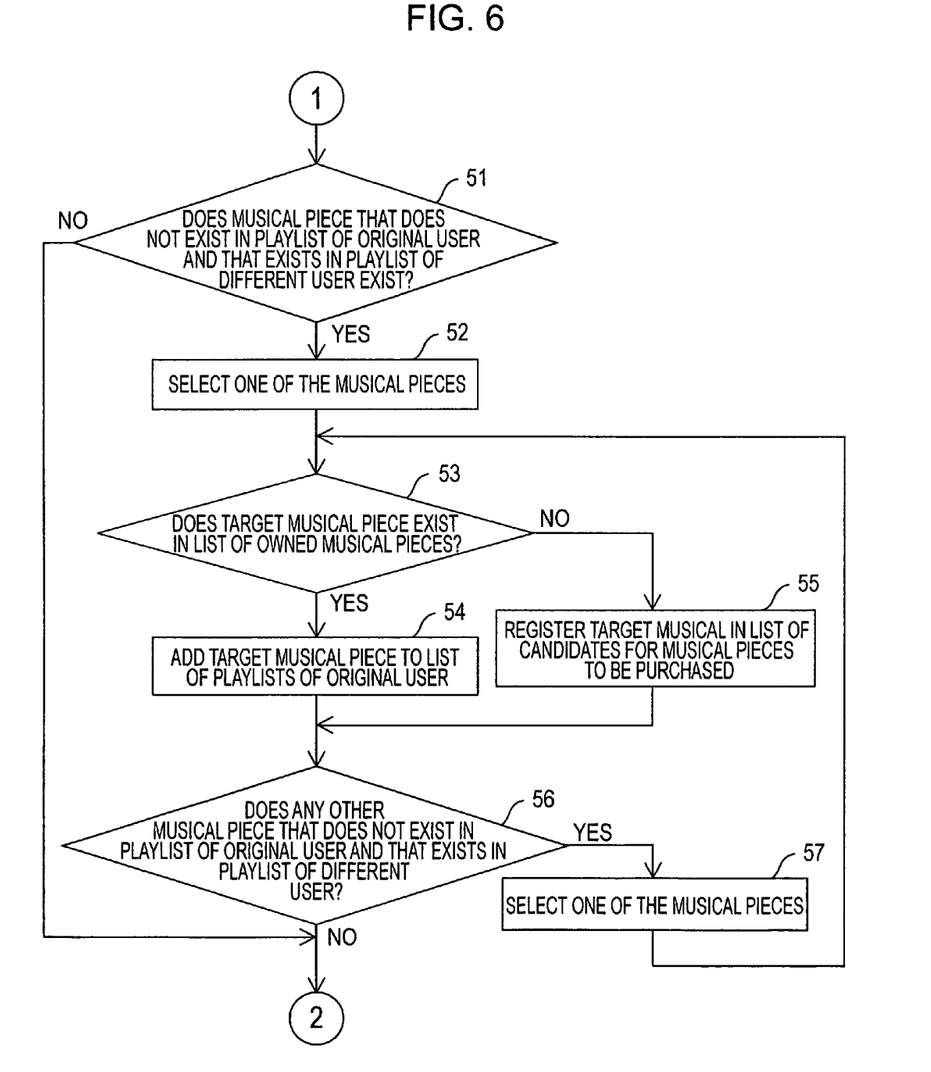
FIG. 6 shows portions of an example of the playlist updating process performed by the user terminal.

FIGS. 5 and 6 show examples of the playlist updating process described above, which is performed by the control section 14 of the user terminal 10.

In the playlist updating process 40 of this example, the playlist updating process begins when the user X in the user terminal 10 starts an operation for connection to the web page 30 of the user Y. Initially, in step 41, the control section 14 accesses the web page 30 and obtains the playlists of the different user (playlists W1 and W2 of the user Y).

Next, in step 42, the control section 14 selects a combination of one of the playlists (playlists U1, U2, and U3) of the original user and one of the playlists (playlists W1 and W2) of the different user. The order of the selection may be arbitrary as long as every combination shown in FIG. 3 are selected once and the same combination is not selected in duplication.

Next, in step 43, the control section 14 computes a similarity between the playlists of the target combination (between the playlist of the original user and the playlist of the different user) on the basis of equation (1).

Next, the process proceeds to step 44, where the control section 14 determines whether or not the computed similarity exceeds a threshold value (=0.5).

When the computed similarity is smaller than or equal to the threshold value, the control section 14 ends the processing for the target combination. The process then proceeds from step 44 to step 45, where a determination is made as to whether or not there is another combination. When there is no other combination, the playlist updating process is completed. If there is another combination, the process proceeds from step 45 to step 46, where another one combination is selected, and the process returns to step 43.

On the other hand, when the similarity computed in step 43 exceeds the threshold value, the process proceeds from step 44 to step 51, where the control section 14 determines whether or not there is a musical piece that is not contained in the playlist of the combination of the original user and that is contained in the playlist of the combination of the different user.

With respect to the second combination of FIG. 3, the musical piece L exists as a musical piece that does not exist in the playlist (playlist W1) of the combination of the original user and that exists in the playlist (playlist U1) of the combination of the different user. With respect to the fifth combination, a musical piece N exists as a musical piece that does not exist in the playlist (playlist U2) of the combination of the original user and that exists in the playlist (playlist W2) of the combination of the different user.

In comparison, there can be a case in which, although the musical piece does not exist in the example of FIG. 2, the musical piece that does not exist in the playlist of the combination of the original user and that exists in the playlist of the combination of the different user even if the similarity between the playlists exceeds the threshold value. An example thereof is a combination in which the musical pieces A, B, C, and D exist in the playlist of the original user and the musical pieces A, B, and C exist in the playlist of the different user. The similarity between the playlists of this combination is 1, which exceeds the threshold value (=0.5).

When the musical piece that does not exist in the playlist of the combination of the original user and that exists in the playlist of the combination of the different user does not exist, the control section 14 completes the processing for the target combination similarly to that when the similarity is smaller than or equal to the threshold value, and the process proceeds from step 51 to step 45.

On the other hand, when a musical piece that does not exist in the playlist of the combination of the original user and that exists in the playlist of the combination of the different user, the process proceeds from step 51 to step 52, where the control section 14 selects one of the musical pieces (when there is only one musical piece that does not exist in the playlist of the combination of the original user and that exists in the playlist of the combination of the different user as in the first and fifth combinations of FIG. 3, that one musical piece). Furthermore, the process proceeds to step 53, where the control section 14 determines whether or not the selected musical piece exists in the list of owned musical pieces.

Then, when the target musical piece (in the case of the first combination of FIG. 3, the musical piece L) exists in the list of owned musical pieces, the process proceeds from step 53 to step 54, where the control section 14 adds the target musical piece to the playlist of the original user, and the process then proceeds to step 56. When the target musical piece (the musical piece N in the case of the fifth combination of FIG. 3) does not exist in the list of owned musical pieces, the process proceeds from step 53 to step 55, where the control section 14 registers the target musical piece in the list of candidates for musical pieces to be purchased. The process then proceeds to step 56.

In step 56, a determination is made as to whether or not there is any other musical piece that does not exist in the playlist of the combination of the original user and that exists in the playlist of the combination of the different user. When there is another musical piece, the process proceeds from step 56 to step 57, where, similarly to step 52, one of the musical pieces is selected, and the process returns to step 53. When there is no other musical piece, the processing for the combination is completed. The process then proceeds from step 56 to step 45.

In step 55, when the target musical piece is to be registered in the list of candidates for musical pieces to be purchased, as described above, playlist specification information is described.

As a result, when the user X purchases the target musical piece through music distribution and records the music data of the target musical piece in the storage device section 16, it is possible to enable the control section 14 to add the musical piece to the playlist of the original user, which is specified by the playlist specification information. Content to be purchased can be directly obtained from another terminal in the case of an environment where copyright is protected. For example, when the terminal of the original user and the terminal of the different user comply with a system in which content can be freely used within a predetermined period of time by paying a predetermined fee (so-called subscription service), the terminal of the original user can perform a searching and presentation process with another terminal and can obtain content data from the other terminal. As a result of obtaining content data together with the searched result, the searching of content and the obtainment of the content can be performed at the same time, and the user becomes possible to efficiently experience new content data. Furthermore, a configuration is also possible in which a searching and presentation process is performed with only a terminal that complies with subscription service and a searching and presentation process is not performed with a terminal that does not comply with subscription service. Furthermore, a configuration is also possible in which a searching and presentation process and the obtainment of content data for the object to be searched are performed with a terminal that complies with subscription service, and only the searching and presentation process is performed with a terminal that does not comply with subscription service.

Figure 7:
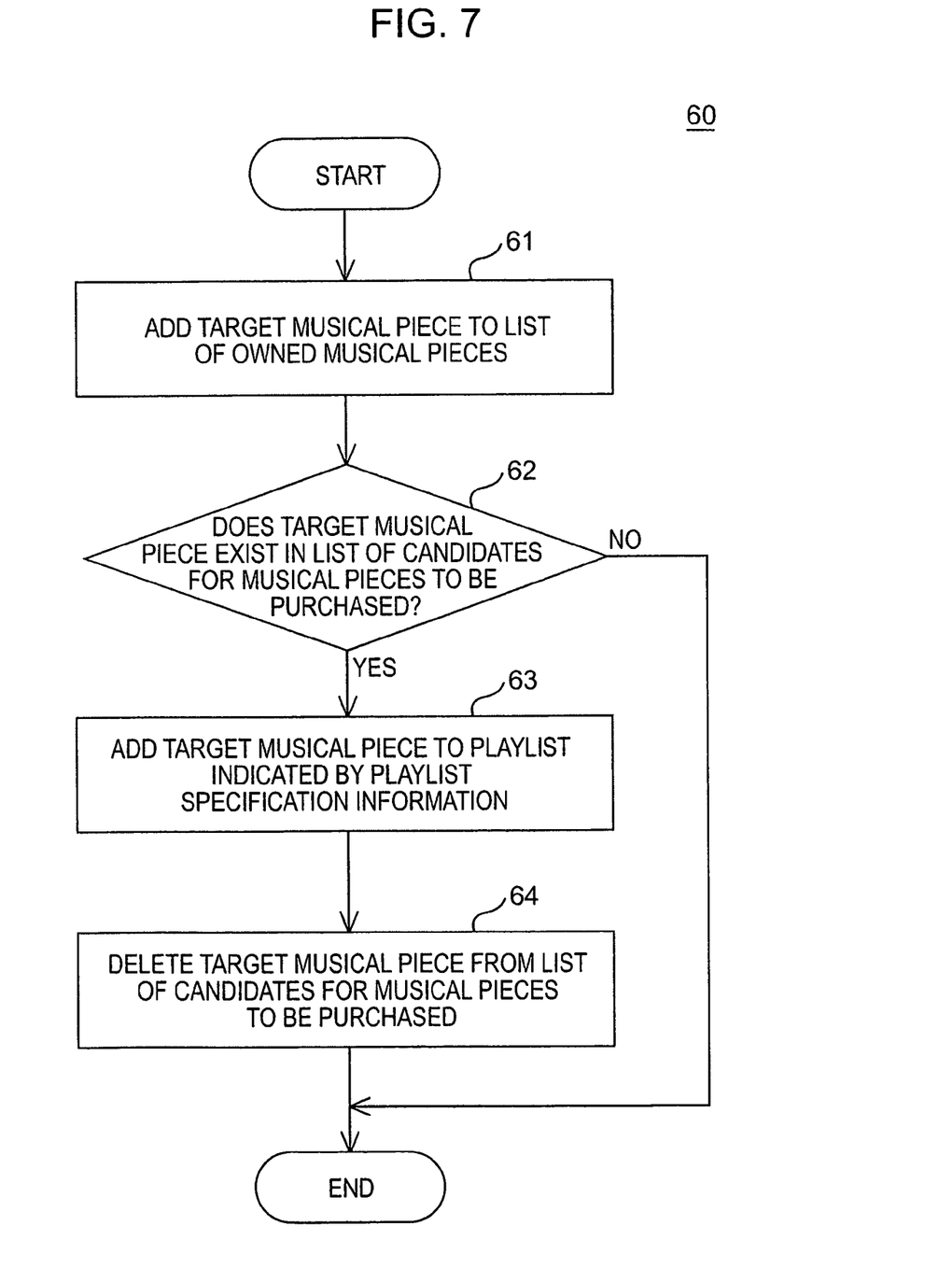
FIG. 7 shows an example of the playlist updating process when a musical piece is purchased.

FIG. 7 shows an example of the playlist updating process. In a playlist updating process 60 of this example, the control section 14 starts a playlist updating process on the basis of instructions from a user X or on the basis of a determination of the control section 14 in accordance with a program when musical piece data that is not stored in the storage device section 16 is newly recorded in the storage device section 16. Initially, in step 61, the target musical piece is added to the list of owned musical pieces.

Next, the process proceeds to step 62, where the control section 14 determines whether or not the target musical piece exists in the list of candidates for musical pieces to be purchased, that is, determines whether or not the music data of the musical piece that exists in the list of candidates for musical pieces to be purchased should be recorded in the storage device section 16.

When the target musical piece does not exist in the list of candidates for musical pieces to be purchased, the control section 14 directly ends the playlist updating process.

On the other hand, when the target musical piece exists in the list of candidates for musical pieces to be purchased, that is, when, for example, the musical piece data of the musical piece L is to be recorded in the storage device section 16 when the list table 20 is in a state shown in FIG. 4, the process proceeds from step 62 to step 63, where the target musical piece is added to the playlist indicated by the playlist specification information. Furthermore, the process proceeds to step 64, where the target musical piece is deleted from the list of candidates for musical pieces to be purchased.

Figure 8:
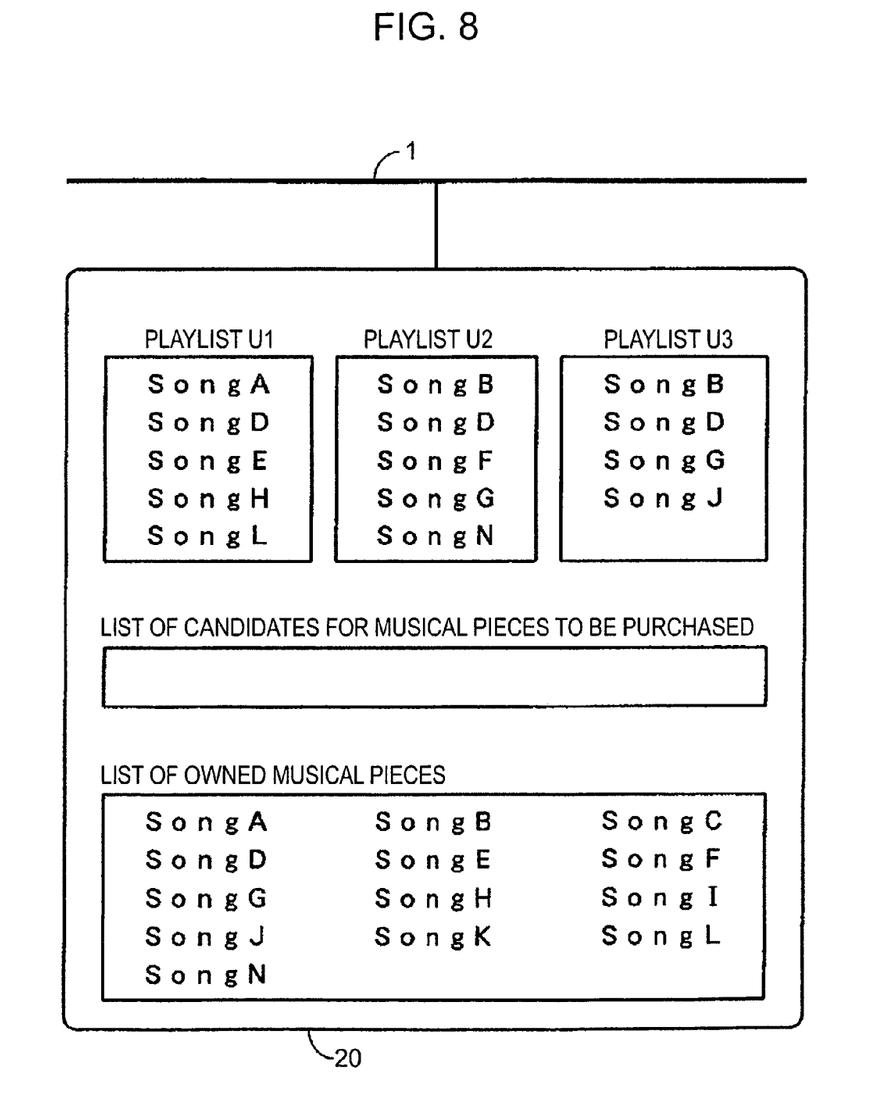
FIG. 8 shows an example of results of the playlist updating process of FIG. 7.

When the list table 20 is in a state shown in FIG. 4, when the user X purchases the musical piece L and records the music data of the musical piece L in the storage device section 16, as a result of the above-described playlist updating process, the list of owned musical pieces in the list table 20, the playlists, and the list of candidates for musical pieces to be purchased are rewritten as shown in FIG. 8.

(2-2. Advantages)

According to the above-described method, it is possible for the user X to update and enrich his/her playlists without troublesome operation, such as viewing playlists of another user Y, actually listening to musical pieces one by one, selecting a musical piece to be added to playlists of the user X, inputting the music title of the musical piece, and specifying a playlist to which the musical piece is added.

Moreover, the musical piece to be added to the playlist and the playlist to which that musical piece is added are determined on the basis of the similarity between the playlists. As a result, the playlist after being updated becomes a playlist in which musical pieces matching his/her interests are combined.

In addition, by referring to the playlists of another user Y a musical piece is selected, and the playlists of the user X are updated. Therefore, a novel combination of musical pieces can occur, and a new way of enjoying music can be enjoyed.

Furthermore, a musical piece that matches user's interests and that is not owned by the user X is displayed in the list of candidates for musical pieces to be purchased. As a consequence, it is possible for the user X to purchase the musical piece without forgetting.

Moreover, the presentation for this list of candidates for musical pieces to be purchased is not a result of searching for a musical piece by specifying a genre or an artist name by the user X, but is a result of referring to the playlists of another user Y. As a result, this becomes an assistance for the user X to find and purchase a musical piece of an artist that the user X does not know and a musical piece of a genre in which the user X is not interested much so far, making it possible to widen the outlook and approach for music of the user X.

3. Another Embodiment or Example

The above-described example shows a case in which the similarity between the playlists (between the playlist of the original user and the playlist of the different user) is computed on the basis of equation (1) and the threshold value is set as 0.5. The similarity can also be computed on the basis of an equation other than equation (1) if the higher the ratio of the musical pieces contained commonly in the playlist of the original user and the playlist of the different user of the target combination, the greater the similarity. Also, the threshold value can be appropriately changed in accordance with the computation equation.

The above-described example shows a case in which playlists of another user Y are made public on the web. The playlists of the user Y may not be made public. For example, a system can also be configured in which, as a result of accessing from the terminal of the user X to the terminal of the user Y by so-called "Peer to Peer", the terminal of the user X obtains the playlists of the user Y, and the searching and presentation process for a musical piece (playlist updating process) is performed. For example, when terminals pass each other, the existence of another terminal is detected, the playlists of the other terminal are obtained, and the searching and presentation process for the musical piece is performed.

Furthermore, the above-described example shows a case in which content is a musical piece (music). The present invention can be applied to a case in which content is a still image that is converted in the form of data, a moving image, a document, or audio other than a musical piece (narration of a novel or a fairly tale). When the content is content that can be recognized through the viewing of a still image, a moving image or the like, in a content searching and presentation method, an image, which is a portion of a still image or a moving image, which is the searched result, can also be displayed on the display section.

It should be understood by those skilled in the art that various modifications, combinations, sub-combinations and alterations may occur depending on design requirements and other factors insofar as they are within the scope of the appended claims or the equivalents thereof.

What is claimed is:

1. In a terminal of an original user comprising a processor and memory storing a playlist an a list of owned content, a content searching and presentation method comprising steps, executed by the processor, of:
    accessing a playlist of a different user from the terminal and obtaining the playlist of the different user;
    computing a similarity between the obtained playlist of the different user and the playlist of the original user in accordance with a predetermined computation equation, wherein content of the playlist of the original user is part of content stored in the memory, and wherein the similarity is based on a number of items common to both the playlist of the original user and the playlist of the different user and on a size of the playlist of the original user and a seize of the playlist of the different user;
    wherein a first item from the playlist of the original user and a second item from the obtained playlist of the different user are considered the same when the first and second items are associated with a same sale source and a same bibliographical information;
    identifying and presenting, as a searched result, at least one item that is contained in the playlist of the different user and that is not contained in the playlist of the original user when the computed similarity exceeds a predetermined threshold value;
    determining whether the list of owned content stored in the memory of the terminal of the original user includes the at least one item, wherein the list of owned content is owned by the original user;
    when it is determined that the list of owned content includes the at least one item, adding the at least one item to the playlist of the original user; and
    when it is determined that the list of owned content does not include the at least one item, adding the at least one item to a list of musical pieces to be purchased.

2. The content searching and presentation method according to claim 1, wherein:
    the terminal has one or more playlists as playlists of the original user, which are playlists whose content is stored on the terminal,
    the obtaining step accesses the playlist of the different user from the terminal and obtains one or more playlists as playlists of the different user,
    the computation step selects one of the obtained playlists of the different user and one of the playlists of the original user as a combination of the playlists and computes a similarity between the playlist of the original user and the playlist of the different user of the combination in accordance with a predetermined computation equation, and
    the presentation step presents, as a searched result, content that is contained in the playlist of the combination of the different user and that is not contained in the playlist of the combination of the original user when the computed similarity exceeds a predetermined threshold value.

3. The content searching and presentation method according to claim 1, wherein, when it is determined that the list of owned content does not include the at least one item, registering the at least one item into a recommendation list.

4. The content searching and presentation method according to claim 3, comprising recording, in the recommendation list, information for specifying a playlist of the original user to which the at least one item should be added, together with information indicating the at least one item to be registered, is recorded.

5. A user terminal having a playlist of an original user, the user terminal comprising:
    a list of owned content that is a list of content stored on the user terminal and owned by the original user, wherein the playlist of the original user is selected from the list of owned content;
    a playlist obtaining section configured to access a playlist of a different user and obtain the playlist of the different user;
    a similarity computation section configured to compute a similarity between the obtained playlist of the different user and the playlist of the original user in accordance with a predetermined computation equation, wherein the similarity is based on a number of items common to both the playlist of the original user and the playlist of the different user; and wherein a first item from the playlist of the original user and a second item from the obtained playlist of the different user are considered the same when the first and second items are associated with a same sale source and a same bibliographical information;

a presentation section configured to present, as a searched result, content that is contained in the playlist of the different user and that is not contained in the playlist of the original user when the computed similarity exceeds a predetermined threshold value, wherein:

when the search result comprises second contend that is contained in the list of owned content and in the playlist of the different user and that is not contained in the playlist of the original user, the presentation section adds the second content from the list of owned content to the playlist of the original user, and when the searched result comprises second content that is not contained in the list of owned content and in the playlist of the original user and that is contained in the playlist of the different user, the presentation section adds the second content from the list of owned content to a list of musical pieces to be purchased.

6. The user terminal according to claim 5, wherein the user terminal has one or more playlists as playlists of the original user, the playlist obtaining section accesses the playlist of the different user and obtains one or more playlists as playlists of the different user, the similarity computation section selects one of the obtained playlists of the different user and one of the playlists of the original user as a combination of the playlists and computes a similarity between the playlist of the original user and the playlist of the different user of the combination in accordance with a predetermined computation equation, and the presentation section presents, as a searched result, content that is contained in the playlist of the combination of the different user and that is not contained in the playlist of the combination of the original user when the computed similarity exceeds a predetermined threshold value.

7. The user terminal according to claim 5, wherein the presentation section registers content that is contained in the playlist of the different user and that is not contained in the list of owned content and in the playlist of the original user to a recommendation list.

8. The user terminal according to claim 7, wherein, in the recommendation list, information for specifying the playlist of the original user to which the content should be added, together with information indicating the content to be registered, is recorded.

9. The user terminal according to claim 5, further comprising a display section configured to display the searched result.

10. A storage device having stored thereon at least one program for performing content searching and presentation in a terminal of an original user having a playlist, the at least one program comprising instructions for executing steps of:

accessing a playlist of a different user from the terminal and obtaining the playlist of the different user;

computing a similarity between the obtained playlist of the different user and the playlist of the original user, which is a playlist whose content is stored on the terminal, in accordance with a predetermined computation equation, wherein the similarity is based on a number of items common to both the playlist of the original user and the playlist of the different user and on a size of the playlist of the original user and a size of the playlist of the different user, and wherein a first item from the playlist of the original user and a second item from the playlist of the different user are considered the same when the first and second items are associated with the same sale source and the same bibliographical information;

presenting, as a searched result, content that is contained in the playlist of the different user and that is not contained in the playlist of the original user when the computed similarity exceeds a predetermined threshold value; and when it is determined that a list of owned content stored in memory of the terminal of the original user includes the at least one item, adding the content that is contained in the playlist of the different user and that is not contained in the playlist of the original user to the playlist of the original user.

11. A user terminal having a list of owned content owned by an original user and at least one playlist of the original user, the terminal comprising:

playlist obtaining means for accessing at least one playlist of a different user and for obtaining the at least one playlist of the different user;

similarity computation means for computing a similarity between the obtained at least one playlist of the different user and the at least one playlist of the original user, which is at least one playlist whose content is stored on the user terminal, in accordance with a predetermined computation equation, wherein the similarity is based on a number of items common to both the at least one playlist of the original user and the at least one playlist of the different user and on a size of the playlist of the original user and a size of the playlist of the different user; and wherein a first item from at least one playlist of the original user and the obtained at least one playlist of the different user are considered the same when the first and second items are associated with a same sale source and a same bibliographical information;

presentation means for:

presenting, as a searched result, at least one item that is contained in the at least one playlist of the different user and that is not contained in the at least one playlist of the original user when the computed similarity exceeds a predetermined threshold value;

determining whether the list of owned content owned by the original user includes the at least one item, and when it is determined that the list of owned content includes the at least one item, adding the at least one item to the playlist of the original user.

12. The content searching and presentation method according to claim 1, wherein the items common to both the playlist of the original user and the playlist of the different user comprise musical pieces common to both the playlist of the original user and the playlist of the different user.

13. The content searching and presentation method according to claim 3, wherein the recommendation list comprises the list of musical pieces to be purchased.

14. The user terminal according to claim 7, wherein the recommendation list comprises a list of musical pieces to be purchased.

15. The storage device of claim 10, wherein the at least one program further comprises instructions for executing a step of registering content that is contained in the playlist of the different user and that is not contained in the list of owned content and in the playlist of the original user into a recommendation list.

16. The storage device of claim 10, wherein the recommendation list comprises a list of musical pieces to be purchased.

17. The user terminal according to claim 11, wherein, when it is determined that the list of owned content does not include the at least one item, the presentation means adds the at least one item to a recommendation list.

\* \* \* \* \*